United States Patent
Houser et al.

(10) Patent No.: US 8,550,315 B2
(45) Date of Patent: Oct. 8, 2013

(54) SPARE TIRE CARRIER VIBRATION DAMPER

(75) Inventors: David M. Houser, Farmington, MI (US); Adrian J. Purvis, Rochester Hills, MI (US); Bhaskar Avutapalli, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1055 days.

(21) Appl. No.: 12/257,464

(22) Filed: Oct. 24, 2008

(65) Prior Publication Data

US 2010/0102095 A1    Apr. 29, 2010

(51) Int. Cl.
*B62D 43/04*    (2006.01)
*B60G 13/00*    (2006.01)

(52) U.S. Cl.
USPC .................. 224/42.23; 224/42.21; 224/42.13; 224/538

(58) Field of Classification Search
USPC .............. 224/42.21, 42.12, 42.23, 42.28, 538
See application file for complete search history.

(56) References Cited

U.S. PATENT DOCUMENTS

| | | | |
|---|---|---|---|
| 3,811,698 A * | 5/1974 | Glance | 280/784 |
| 4,047,629 A | 9/1977 | Klein | |
| 4,537,555 A | 8/1985 | Combs | |
| 5,186,371 A | 2/1993 | Josefczak et al. | |
| 5,197,641 A | 3/1993 | Montgomery, Jr. | |
| 5,992,885 A | 11/1999 | Fukagawa et al. | |
| 6,682,293 B2 | 1/2004 | Dziedzic et al. | |
| 6,871,841 B2 | 3/2005 | Brestelli et al. | |
| 2006/0108489 A1 * | 5/2006 | Hartgers et al. | 248/317 |

* cited by examiner

*Primary Examiner* — Nathan J Newhouse
*Assistant Examiner* — Corey Skurdal
(74) *Attorney, Agent, or Firm* — Ralph E. Smith

(57) ABSTRACT

An apparatus for damping vibration in a vehicle structure via a mass of a spare wheel includes a bar. The bar has a first end elastically coupled to the vehicle structure, wherein the first end is arranged for vertical movement relative to the vehicle structure. The bar also has a second end pivotably coupled to the vehicle structure, wherein the second end is arranged to facilitate the vertical movement of the first end. The bar additionally includes an arrangement for mounting a spare wheel, wherein damping of vibration in the vehicle structure is provided when the spare wheel is mounted on the bar.

17 Claims, 3 Drawing Sheets

SPARE TIRE CARRIER VIBRATION DAMPER

FIELD OF THE INVENTION

The present invention relates to an apparatus for damping vibration, and, more particularly, for damping vibration in a vehicle structure.

BACKGROUND OF THE INVENTION

In operation motor vehicle structures experience various vibrations. Such vibrations are typically generated by an interaction of factors such as vehicle speed, road surface imperfections, vehicle suspension tuning and certain vehicle structural characteristics, for example, frame weight and stiffness.

It is commonly known that unattenuated vibrations in a vehicle structure are generally undesirable. Tuned mass dampers are typically used to balance out and absorb more severe structural vibrations with comparatively light components. Typically, however, tuned mass dampers are add-on structures. As such tuned mass dampers not only introduce additional mass but also add cost to the vehicle, while generally serving but a single function, i.e. damping of structural vibrations.

SUMMARY OF THE INVENTION

The present invention is an apparatus for damping vibration in a vehicle structure via a mass of a spare wheel. The apparatus includes a bar having a first end elastically coupled to the vehicle structure, wherein the first end is arranged for vertical movement relative to the vehicle structure. The bar also includes a second end pivotably coupled to the vehicle structure. The second end is arranged to facilitate the vertical movement of the first end. The bar additionally includes an arrangement for mounting a spare wheel. The apparatus is thus arranged to provide damping of vibration in the vehicle structure when the spare wheel is mounted on the bar.

The vehicle structure may include a frame. The vehicle structure may additionally include a first cross-member and a second cross-member, wherein the first end of the bar may be coupled to the first cross-member, and the second end of the bar may be coupled to the second cross-member. The first cross-member may be elastically coupled to the frame, or, alternatively, the first end of the bar may be elastically coupled to the first cross-member. The coupling of the second end to the vehicle structure may be achieved via a hinge. The bar my be arranged on the underside of the frame, and the arrangement on the bar for mounting the spare wheel may be positioned between the first end and the second end of the bar to optimize damping.

It should be understood that the detailed description and specific examples which follow, while indicating preferred embodiments of the invention, are intended for purposes of illustration only and are not intended to limit the scope of the invention.

DETAILED DESCRIPTION

In general the present invention is directed to damping vibration, and, more particularly, for damping vibration in a vehicle structure via a mass of a spare wheel.

Figure 1:
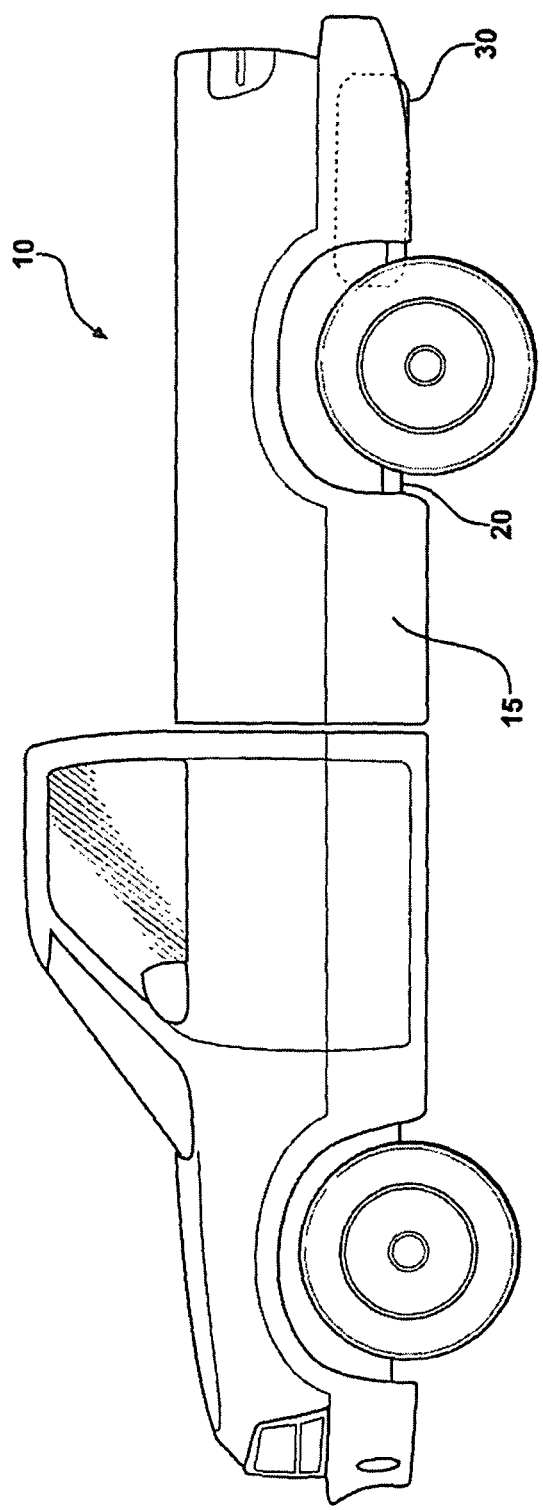
FIG. 1 is side view of a typical vehicle structure having a frame and a spare wheel mounted to the underside of the frame according to prior art.
Figure 2:
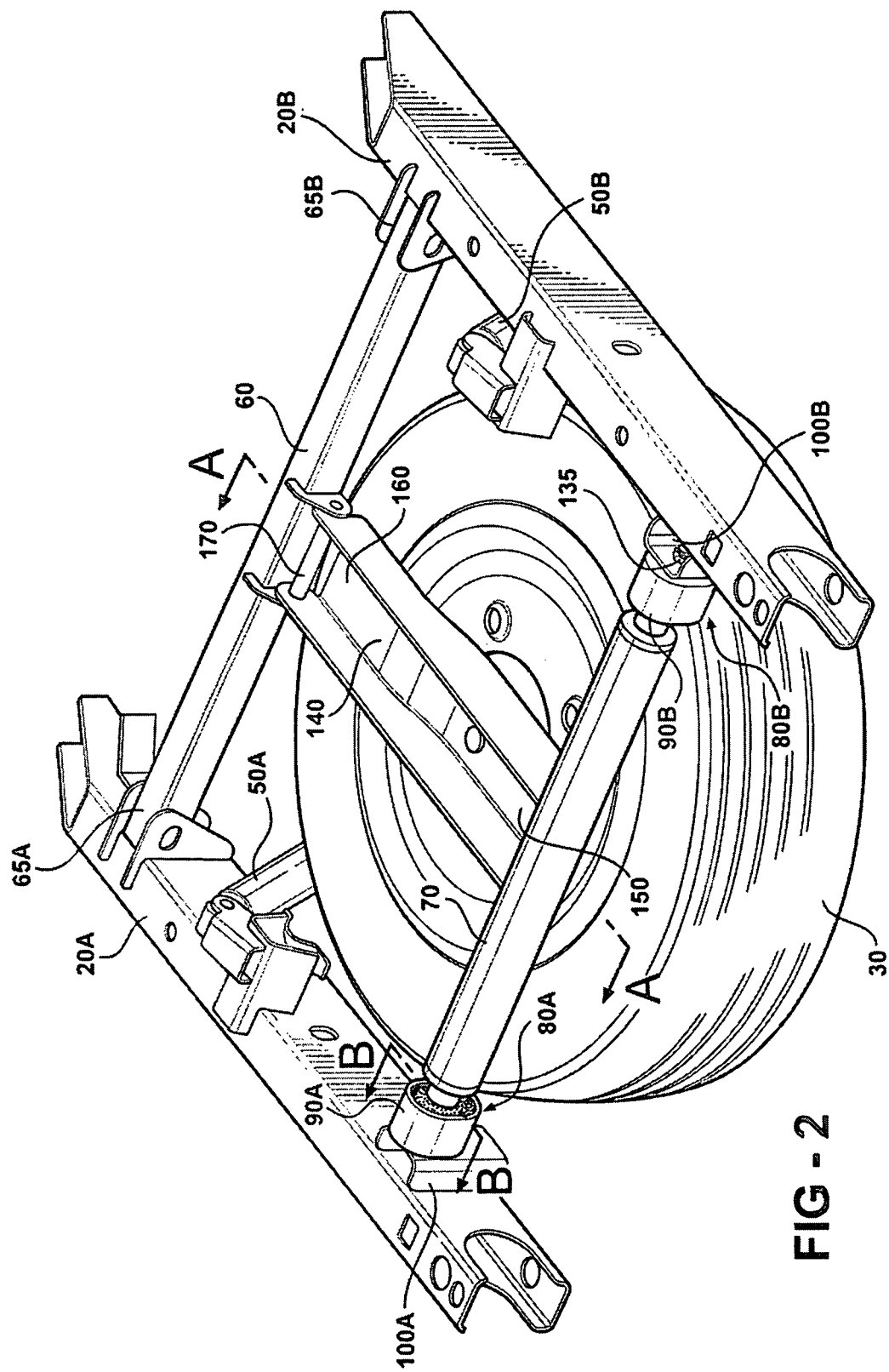
FIG. 2 is a perspective view of an apparatus for damping vibration in the vehicle structure via a mass of the spare wheel according to the invention.

Referring now to the drawings in which like elements of the invention are identified with identical reference numerals throughout, FIGS. 1 and 2 denote a vehicle 10, having a frame 20 included as part of vehicle body structure 15. Spare wheel 30 is shown mounted to the underside of the frame 20, which is one of the typical locations for mounting a spare wheel. Frame 20 includes frame rails 20A and 20B. Frame rails 20A and 20B may be mounted to the body structure 15 directly with fasteners, such as threaded bolts (not shown), or via rubber mounts (not shown), thus forming a body on frame. Alternately, frame 20 may be integrated (typically by welding) into the body structure 15 (not shown), thus forming a unitary body and frame construction, i.e. a unibody. Vehicle suspension components 50A and 50B are coupled to frame rails 20A and 20B respectively (shown in FIG. 2).

As shown in FIG. 2, cross-member 60 is coupled to frame rails 20A and 20B with mounting brackets 65A and 65B, respectively. Cross-member 70 is elastically coupled to frame rails 20A and 20B with flexible couplings 80A and 80B, respectively. Each flexible coupling, 80A and 80B, includes casing 90 for mounting to the frame rail via bracket 100A or 100B, respectively. Each flexible coupling, 80A and 80B, additionally includes a circular bushing 120 disposed within casing 90. Casing 90 is configured to hold and restrain bushing 120 when vibrations in the vehicle structure are being damped. At each frame rail, 20A and 20B, cross-member 70 includes a circular cross-section portion 130 (shown in FIG. 3). Each portion 130 extends through the center of each respective bushing 120 (shown in FIG. 4), thereby elastically suspending cross-member 70 within the bushing and against casing 90. Each portion 130 may be secured on the opposite side of the bushing via a threaded nut 135, as shown in FIG. 2. Bushing 120 may be made from a specially formulated polymer, or from any other flexible material capable of providing sufficient absorption of vibration, as well as having suitable durability in a specific application.

Bar 140 is rigidly coupled to cross-member 70 at the bar's first end 150. Bar 140 is also pivotably coupled to cross-member 60 at the bar's second end 160 via hinge 170. Bar 140 may be fabricated from a high strength material such as, for example, steel or aluminum, or be molded from an engineered plastic of suitable strength for the forces encountered in a specific application. Pivotal coupling of second end 160 is provided to facilitate a degree of vertical movement of first end 150, as permitted by flexible couplings 80A and 80B. In operation, the motion path of the first end 150 is an arc controlled by hinge 170. Movements of small amplitude along such an arcuate path, however, generate essentially vertical motion. Such motion, when coupled with appropriately chosen mass, spring and damping rates, is sufficient for damping vibration typically encountered in a vehicle structure. As a result, bar 140 elastically coupled on the first end, and pivotably coupled on the second end, forms a tuned mass damper when spare wheel 30 is mounted on the bar. Such an apparatus, thus permits absorption of vibration experienced by frame 20 when the vehicle is in operation.

Figure 3:
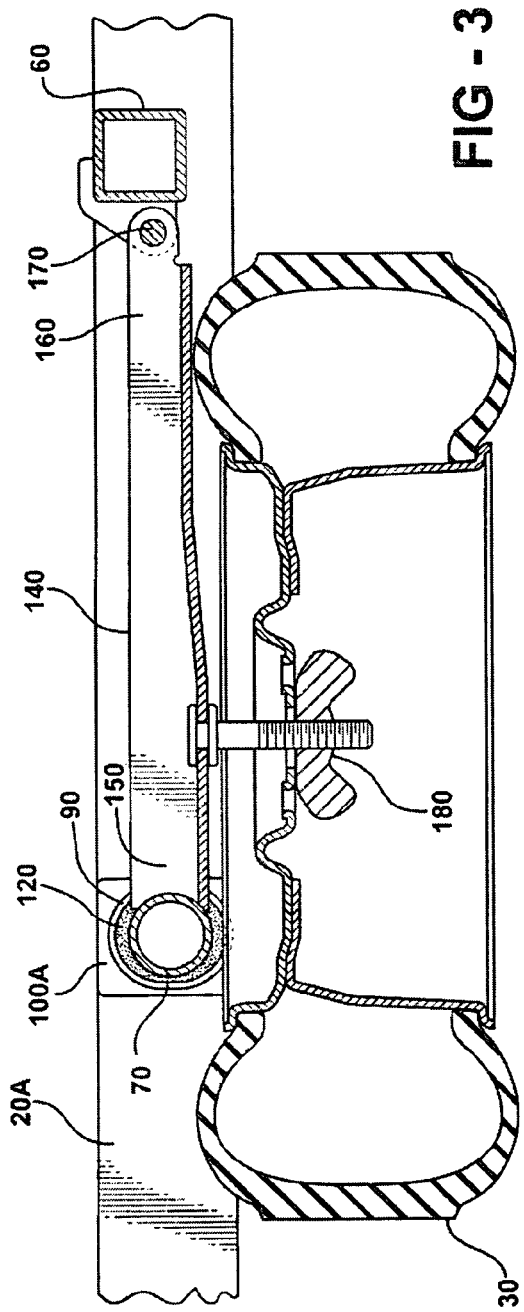
FIG. 3 is a cross-sectional view of the apparatus taken along A-A shown in FIG. 2.
Figure 4:
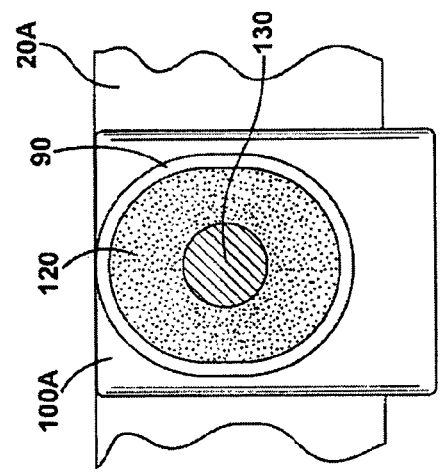
FIG. 4 is a cross-sectional view of the apparatus taken along B-B shown in FIG. 2.

Bar 140 includes an arrangement 180 for mounting the spare wheel 30. The spare wheel mounting arrangement 180 may comprise a threaded bolt and wing-nut, as shown in FIG. 3, or any other similarly reliable device capable of facilitating convenient mounting and dismounting of the spare wheel. The spare wheel mounting arrangement may be positioned between the first end 150 and the second end 160 to optimize damping of vibration in frame 20.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for damping vibration in a vehicle structure via a mass of a spare wheel, comprising
    a bar having
        i) a first end fixedly coupled to a first cross-member, the first cross-member elastically coupled to the vehicle structure and arranged for vertical movement relative to the vehicle structure;
        ii) a second end pivotably coupled to the vehicle structure and arranged to facilitate the vertical movement of the first end; and
    an arrangement on the bar for mounting a spare wheel;
    wherein damping of vibration in the vehicle structure is provided when the spare wheel is mounted on the bar,
        wherein the vehicle structure comprises a second cross-member to which the second end is pivotably coupled for relative motion between the second cross-member and the second end.

2. An apparatus of claim 1 wherein the vehicle structure comprises a frame, and the first cross-member is elastically coupled to the frame.

3. An apparatus of claim 1 wherein the arrangement for mounting the spare wheel is positioned between the first end and the second end to optimize damping.

4. An apparatus of claim 1 wherein the coupling of the second end is via a hinge.

5. An apparatus of claim 1 wherein the arrangement for mounting the spare wheel comprises a bolt and a wing-nut arrangement.

6. An apparatus of claim 1 wherein the vehicle structure comprises a frame and the bar is arranged on an underside of the frame.

7. A vehicle having an apparatus for damping vibration in the vehicle using a spare wheel, the vehicle comprising
    a frame;
    a first cross-member mounted on the frame;
    a second cross-member elastically mounted on the frame relative to the first cross-member and arranged for vertical movement relative to the vehicle structure;
    a spare wheel; and
    a bar arranged for mounting the spare wheel, the bar having a first end and a second end, the first end pivotably coupled to the first cross-member and the second end coupled to the second cross-member, the first end being arranged to facilitate the vertical movement of the second cross-member;
    wherein damping of vibration in the vehicle structure is provided when the spare wheel is mounted on the bar.

8. An apparatus of claim 7 wherein an arrangement for mounting the spare wheel to the bar is positioned between the first end and the second end to optimize damping.

9. An apparatus of claim 7 wherein the coupling of the first end is via a hinge.

10. An apparatus of claim 8 wherein the arrangement for mounting the spare wheel to the bar comprises a bolt and a wing-nut arrangement.

11. An apparatus of claim 7 wherein the bar is arranged on an underside of the frame.

12. An apparatus for damping vibration in a vehicle structure via a mass of a spare wheel, comprising
    a bar having
        i) a first end fixedly coupled to a first cross-member, the first cross-member elastically coupled to the vehicle structure and arranged for vertical movement relative to the vehicle structure;
        ii) a second end pivotably coupled to the vehicle structure and arranged to facilitate the vertical movement of the first end; and
    an arrangement on the bar for mounting a spare wheel;
    wherein damping of vibration in the vehicle structure is provided when the spare wheel is mounted on the bar,
        wherein the vehicle structure comprises a first cross-member to which the second end is pivotably coupled.

13. An apparatus of claim 12 wherein the vehicle structure comprises a frame, wherein the first cross-member is elastically coupled to the frame, and wherein the second cross-member is fixedly coupled to the frame.

14. An apparatus of claim 12 wherein the arrangement for mounting the spare wheel is positioned between the first end and the second end to optimize damping.

15. An apparatus of claim 12 wherein the coupling of the second end is via a hinge.

16. An apparatus of claim 12 wherein the arrangement for mounting the spare wheel comprises a bolt and a wing-nut arrangement.

17. An apparatus of claim 12 wherein the vehicle structure comprises a frame and the bar is arranged on an underside of the frame.

* * * * *